(12) United States Patent
Zhao

(10) Patent No.: US 10,701,780 B2
(45) Date of Patent: Jun. 30, 2020

(54) LIGHT-EMITTING DIODE LIGHT STRING CONTROL SYSTEM

(71) Applicant: HongChun Zhao, ShenZhen (CN)

(72) Inventor: HongChun Zhao, ShenZhen (CN)

( * ) Notice: Subject to any disclaimer, the term of this patent is extended or adjusted under 35 U.S.C. 154(b) by 0 days.

(21) Appl. No.: 16/734,352

(22) Filed: Jan. 5, 2020

(65) Prior Publication Data

US 2020/0146126 A1    May 7, 2020

(30) Foreign Application Priority Data

Aug. 14, 2019  (CN) .......................... 2019 1 0747828

(51) Int. Cl.
| | |
|---|---|
| *H05B 33/00* | (2006.01) |
| *H05B 45/54* | (2020.01) |
| *H05B 45/32* | (2020.01) |
| *H05B 47/195* | (2020.01) |
| *H05B 45/24* | (2020.01) |
| *H05B 45/14* | (2020.01) |

(52) U.S. Cl.
CPC ............ *H05B 45/54* (2020.01); *H05B 45/24* (2020.01); *H05B 45/32* (2020.01); *H05B 47/195* (2020.01); H05B 45/14 (2020.01)

(58) Field of Classification Search
CPC .......... G06K 7/10693; G06K 7/10702; G06K 7/10801; G06K 7/10851; G06K 7/14; G06K 7/10881; G06K 2207/1012; G06K 7/10; G06K 7/10564; G06K 7/10584; G06K 7/10594; G06K 7/10603; G06K 7/10663; G06K 7/10673; G06K 7/10792; G06K 7/10811; G06K 7/10861; G06K 7/10871; G06K 7/10891; G06K 7/10544; G06K 7/109; G06K 7/1443; G06K 17/0022; G06K 2207/1016; G06K 2207/1017; G06K 2207/1018; H05B 45/00; H05B 45/20; H05B 47/18; H05B 45/22; H05B 45/46; H05B 33/08; H05B 45/24; H05B 45/37; H05B 47/10; H05B 47/105; H05B 47/155
See application file for complete search history.

(56) References Cited

U.S. PATENT DOCUMENTS

| | | |
|---|---|---|
| 9,380,662 B1 | 6/2016 | Peng |
| 10,129,959 B2 | 11/2018 | Luo |
| 2009/0140716 A1 | 6/2009 | Mantovani |

*Primary Examiner* — Monica C King
(74) *Attorney, Agent, or Firm* — iPA & iPM

(57) ABSTRACT

The present invention discloses a light-emitting diode light string control system, which comprises: a switching unit having a power input end, a power output end, and a controlled end; the power output end is connected to the light-emitting diode light string; a control unit, and the control unit is connected to the controlled end of the switching unit; a second power generating unit, and the second power generating unit is connected to the light-emitting diode light string. According to the present invention, the light-emitting control command sent by the control unit is loaded on the power line of the light-emitting diode through a carrier wave mode to realize the driving of the brightness variation of the light-emitting diode light string, which saves costs and simplifies the control circuit of the light-emitting diode; the short-circuit protection unit detects whether the light-emitting diode is short-circuited in real time, has fast response rate to the protection of the light-emitting diode light string when it is short-circuited, fewer components are needed, the production cost is low, the circuit is simple, which is easy to implement, safe and reliable.

9 Claims, 1 Drawing Sheet

LIGHT-EMITTING DIODE LIGHT STRING CONTROL SYSTEM

TECHNICAL FIELD

The present invention relates to the field of lighting control, in particular to a light-emitting diode light string control system.

BACKGROUND

Light-emitting diode light strings are widely used by users on building exteriors, trees, signboards, and landscapes to add aesthetic appeal. At present, it can be roughly divided into two types of connection methods: series connection and parallel connection. The series light-emitting diode light string connects a plurality of light-emitting diodes in series. Although the series connection method makes the light-emitting diode light string module easy to be produced, failure of one light-emitting diodes will not enable the electric current to be transmitted during use, so that the entire diode light string cannot be lit. Parallel light-emitting diode light strings are a combination of multiple light-emitting diodes connected in parallel. Each light-emitting diode light string has several light-emitting diodes. In order to achieve the synchronization, asynchronous or point control effect of the light-emitting diode light strings, each light-emitting diode connected to the light-emitting diode light string will be made to have one address coding, and each light-emitting diode must have a control line and an address line to control it. If 10 light-emitting diodes are connected in parallel, 10 control lines and 10 address lines must be used to control the 10 light-emitting diodes. The greater the number of light-emitting diodes connected in parallel, the more the control lines and address lines, resulting in complicated circuits, difficult to manufacture, and high cost.

Chinese patent for invention 201510402773.7 discloses a light-emitting diode light string control system. The light-emitting diode driving device includes a switching unit, a control unit and a voltage level generating unit. The switching unit is electrically connected to the light-emitting diode light string and the control unit. The voltage level generating unit is electrically connected to the output end of the light-emitting diode driving device and the light-emitting diode light string. The Zener diode ZD of the voltage level generating unit is connected in parallel with the capacitor C. The cathodes of the Zener diode ZD connected in series with the resistor R5 are connected to the rectified input end by the alternating current power supply and the anode of the series diode D, respectively, then electrically connected with the light-emitting diode light string. The anode of the Zener diode ZD is grounded, and the Zener diode ZD determines the output voltage value of the voltage level generating unit. When the output voltage of the voltage level generating unit is not high, such as 3 to 6 v, there are fewer zener diodes that meet the requirements, and zener diodes below 6V belong to zener breakdown, and the voltage stabilizing characteristics are not as good as avalanche breakdown. When a short-circuit fault occurs in a series light-emitting diode light string, the line current increases, and it is easy to burn out the light-emitting diode light string and the power supply, there is even a dangerous situation of fire, which will cause a potential safety hazard. Current light-emitting diode light string is usually provided with a short-circuit protection circuits at the output end, but the short-circuit protection circuits are more complicated and require more components. Although the potential safety hazard can be avoided, when the short-circuit fault of the light string is resolved, the light-emitting diode light string control system cannot resume normal operation by itself, it can only be abandoned, which cause waste of resources.

SUMMARY OF INVENTION

In view of the above-mentioned shortcomings of the existing parallel light-emitting diode light strings, which are complicated circuits, difficult to manufacture, and high cost, and unable to automatically resume normal operation when the fault of the light string is resolved, the applicant provides a light-emitting diode light string control system having a reasonable structure, thereby reducing the use of transmission lines, having simple lines, high security, being able to automatically resume normal operation when the fault of the light string is resolved.

The technical solution adopted by the present invention is as follows:

A light-emitting diode light string control system includes:

a switching unit having a power input end, a power output end, and a controlled end; the power output end is connected to the light-emitting diode light string;

a control unit, and the control unit is connected to the controlled end of the switching unit;

a second power generating unit, and the second power generating unit is connected to the light-emitting diode light string;

when no light-emitting pulse signal is to be transmitted, the control unit controls the switching unit to be turned on, and the power supply unit transmits a DC power supply having a first voltage to the light-emitting diode light string to drive the light emission of the light-emitting diode light string; when the light-emitting pulse signal generated by the control unit is to be transmitted, the control unit controls the on and off actions of the switching unit, and when the control unit controls the switching unit to cut off, the DC current having a second voltage generated by the second power generating unit is transmitted to the light-emitting diode light string; and the second voltage is less than the first voltage.

As a further improvement of the above technical solution:

A short-circuit protection unit is further included, which connects the light-emitting diode light string and the light-emitting diode light string; the short-circuit protection unit detects the voltage value of the cathode end of the light-emitting diode light string, when the voltage value is greater than a critical value, the short-circuit protection unit sends a second protection signal, and the control unit controls the switching unit to cut off; when the existing voltage is less than the critical value, the short-circuit protection unit sends a first protection signal or does not send a signal.

A short-circuit protection unit is further included, and the short-circuit protection unit includes:

a third resistance R3, the third resistance R3 is connected to the cathode end of the light-emitting diode light string;

a fourth resistance R4, the fourth resistance R4 is connected to the base level of the transistor Q2 and the third resistance R3;

the transistor Q2 and the collector of the transistor Q2 are connected to the control unit.

The short-circuit protection unit further includes a second resistance R2, and two ends of the second resistance R2 are connected to the collector of the transistor Q2 and the power supply unit, respectively.

A second power generating unit includes:

a first resistance R1, and the first resistance R1 is connected to the power supply unit;

a capacitor C2, and the capacitor C2 is connected to the divider resistance R1;

a diode D1, and the diode D1 is connected to the first resistance R1 and the power output end;

a voltage stabilizing element, and the voltage stabilizing element is connected to the first resistance R1.

The voltage stabilizing element is a light-emitting diode LED1.

A wireless receiving unit is further included, the wireless receiving unit connecting the control unit and the power supply unit, and the wireless receiving unit is connected to an external remote control via radio waves or infrared ray.

A storage unit is further included, the storage unit is connected to the control unit, and the storage unit stores the address coding and color coding of the light-emitting diode light string.

The switching unit is a field-effect transistor, and the control unit includes a microprocessor.

The beneficial effects of the present invention are as follows:

According to the present invention, the light-emitting control command sent by the control unit is loaded on the power line of the light-emitting diode through a carrier wave mode to realize the driving of the brightness variation of the light-emitting diode light string, which enables several parallel light-emitting diodes to be synchronized or point-controlled operation without configuring additional signal transmission lines, it saves costs and simplifies the control circuit of the light-emitting diode. In the second power generating unit, a light-emitting diode with a forward voltage drop ranging from 1.6 to 3V is used. The selection range is wide, economical and effective, and the voltage-stabilizing characteristics are good. The light-emitting diode plays a fault prompt function when the light string is short-circuited and its noise is smaller than that of a Zener diode.

The short-circuit protection unit of the present invention detects whether the light-emitting diode is short-circuited in real time, has fast response rate to the protection of the light-emitting diode light string when it is short-circuited. As soon as a short-circuit fault is detected, the short-circuit protection unit sends a low-level second protection signal to the control unit. The control unit controls the switching unit to cut off, and the light-emitting diode light string is disconnected from the DC power supply with the first voltage in time, protecting the remaining light-emitting diodes and power supply units, thereby reducing maintenance costs and economic losses; when the short-circuit fault is removed, the light-emitting diode light string can produce changes in light according to the light-emitting pulse signal of the control unit in time, so that the light-emitting diode light string control system works quickly and normally, reducing the maintenance work and improving the resource utilization rate. The short-circuit protection unit only needs one transistor and two resistances, fewer components are needed, the production cost is low, the circuit is simple, which is easy to implement, safe and reliable.

The present invention can be controlled remotely and can freely adjust the brightness, color and light emission change of the light-emitting diode light string.

The circuit of the present invention is simple, the performance is reliable, the production cost is low, and the utilization rate is high.

Figure 1:
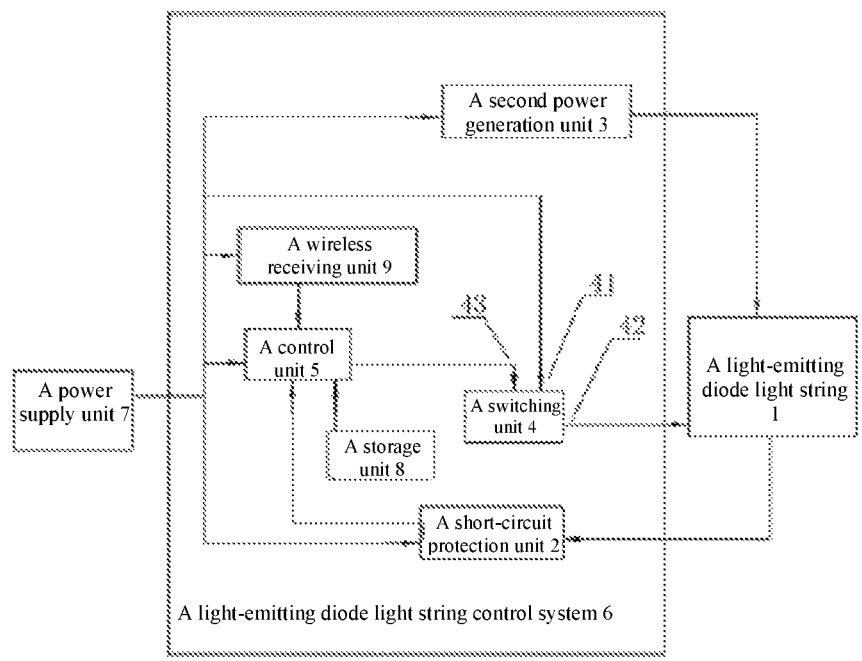
FIG. 1 is a schematic diagram of the present invention.

In the drawings: 1. light-emitting diode light string; 2. short-circuit protection unit; 3. second power generating unit; 4. switching unit; 41. power input end; 42 power output end; 43. controlled end; 5. control unit; 6. light-emitting diode light string control system; 7. power supply unit; 8, storage unit; 9, wireless receiving unit.

Specific Embodiments

The following describes specific embodiments of the present invention with reference to the accompanying drawings.

As shown in FIG. 1, the light-emitting diode light string control system 6 of the present invention is connected to the light-emitting diode light string 1 and the power supply unit 7. The power supply unit 7 provides a DC voltage to the light-emitting diode light string control system 6. The light-emitting diode light string 1 includes a plurality of light-emitting diodes connected in parallel to each other, and each light-emitting diode has an address coding. The light-emitting diode light string control system 6 includes a switching unit 4, a control unit 5, and a second power generating unit 3, wherein the switching unit 4 has a power input end 41, a power output end 42, and a controlled end 43. The power input end 41 is connected to a power supply unit 7, the power output end 42 is connected to the anode end of the light-emitting diode light string 1, the control unit 5 generates a light-emitting pulse signal, the control unit 5 is connected to the controlled end 43 of the switching unit 4, and the second power generating unit 3 is connected to the light-emitting diode light string 1 and power supply unit 7. A short-circuit protection unit 2 is further included, which connects to the control unit 5 and the cathode end of the light-emitting diode light string 1. A storage unit 8 is further included, the storage unit 8 is connected to the control unit 5, and the storage unit 8 stores the address coding and color coding of the light-emitting diode light string 1, and the last lighting pattern used before the control unit 5 is turned off. A wireless receiving unit 9 is further included, the wireless receiving unit 9 connects the control unit 5 and the power supply unit 7, and the wireless receiving unit 9 is connected to an external remote control via infrared ray or radio waves to realize wireless connection.

The wireless receiving unit 9 receives an external wireless signal with a light-emitting pattern coding, and converts the wireless signal into a control signal of the control unit 5 and sends it to the control unit 5. The control unit 5 sets a plurality of light-emitting patterns. According to the selected light-emitting patterns, the control unit 5 generates a corresponding light-emitting pulse signal according to the light-emitting pattern coding including the address coding and the color coding information. When no light-emitting pulse signal is to be transmitted, the control unit 5 controls the switching unit 4 to be turned on, and the power supply unit 7 transmits a DC power supply having a first voltage to the light-emitting diode light string 1 to drive the light-emitting diode light string 1; when the light-emitting pulse signal generated by the control unit 5 is to be transmitted, the control unit 5 controls the on and off actions of the switching unit 4 according to the light-emitting pulse signal, and when the control unit 5 controls the switching unit 4 to cut off, the DC current having a second voltage generated by the second power generating unit 3 is transmitted to the light-emitting diode light string 1 to provide the working voltage for the internal chip of the light-emitting diode. The on and off actions of the switching unit 4 is controlled by the control unit 5 to form a plurality of light-emitting control commands having a first voltage and a second voltage, and the light-emitting control command is output to the electrically connected light-emitting diode light string 1, where a light emission control command is received and corresponding light emission change is performed. The second voltage is less than the first voltage. The short-circuit protection unit (2) detects the voltage value of the cathode end of the light-emitting diode light string (1), when the voltage value is greater than a critical value, the short-circuit protection unit (2) sends a second protection signal, and the control unit (5) controls the switching unit (4) to cut off, then the switching unit (4) is controlled to turn on after a delay of a predetermined time T; when the existing voltage is less than the critical value, the short-circuit protection unit (2) sends a first protection signal or does not send a signal.

Figure 2:
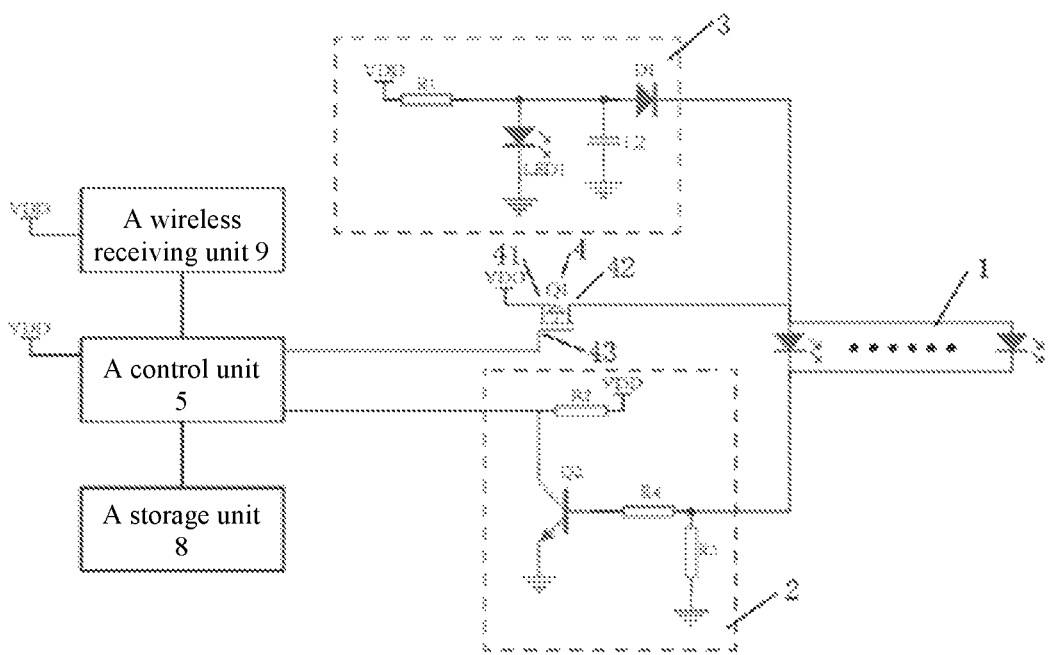
FIG. 2 is a circuit diagram of the present invention.

As shown in FIG. 2, the power supply unit 7 is a DC power supply VDD of +5V. The power supply end of the control unit 5 is connected to a DC power supply VDD. The control unit 5 includes a microprocessor and a voltage stabilizing circuit. The input end of the voltage stabilizing circuit is connected to a DC power supply VDD, and the output end is connected to the power supply end of the microprocessor. The voltage stabilizing circuit is used to convert the DC power supply VDD to the working voltage of the microprocessor. The switching unit 4 is a P-channel enhanced field effect transistor Q1. The gate of the field effect transistor Q1 is connected to the control unit 5, the source is connected to the DC power source VDD, and the drain is connected to the anode end of the light-emitting diode light string 1. The second power generating unit 3 includes a first resistance R1, a second capacitor C2, a diode D1, and a voltage stabilizing element. The first resistance R1 is used for voltage division, and the second capacitor C2 is used for filtering. The voltage stabilizing element is a light-emitting diode LED1 for determining the value of the second voltage. One end of the divider resistance R1 is connected to the DC power source VDD, and the other end is connected to the anode of the diode D1, the anode of the grounded light-emitting diode LED1, and the grounded second capacitor C2, respectively, and the cathode of the diode D1 is connected to the anode end of the light-emitting diode light string 1. The short-circuit protection unit 2 includes a third resistance R3, a fourth resistance R4, a transistor Q2, and a second resistance R2. Wherein, the cathode end of the light-emitting diode light string 1 is connected to the grounded third resistance R3, and the fourth resistance R4, and the other end of the fourth resistance R4 is connected to the base level of transistor Q2; the emitter of transistor Q2 is grounded, the collector is connected to the control unit 5 and the DC power supply VDD via a second resistance R2, respectively, and the second resistance R2 is used to improve the reliability of the signal output of the short-circuit protection unit 2. In other embodiments, since the port connected the control unit 5 and the short-circuit protection unit 2 is automatically at high level when there is no signal input, the collector can be directly connected to the control unit 5 without connecting the second resistance R2 and the DC power supply VDD; when the transistor Q2 is cut off, the short-circuit protection unit 2 does not output a signal to the control unit 5. The wireless receiving unit 9 includes a voltage stabilizing chip and a wireless receiving chip. The voltage stabilizing chip is connected to a DC power source VDD for converting the DC power source VDD into a working voltage of the wireless receiving chip. The voltage stabilizing chip is connected to the power supply end of the wireless receiving chip. The output end of the wireless receiving chip is connected to the control unit 5, and the input end of the wireless receiving chip receives wireless signals from an external remote control.

The working principle of the light-emitting diode light string control system 6 is:

1. When the power is turned on, the wireless receiving unit 9 receives an external wireless signal with a light-emitting pattern coding sent by the external remote control, and converts the wireless signal into a control signal of the control unit 5 and sends it to the control unit 5.

2. The DC power source VDD turns on the light-emitting diode LED1 through the first resistance R1; the DC power source VDD supplies power to the control unit 5; when no light-emitting pulse signal is to be transmitted, the control unit 5 sends a low level to the gate of the field effect transistor Q1, thus the gate potential of the field effect transistor Q1 is low, while the source potential is high, so that the field effect transistor Q1 is turned on, its drain potential is higher than the anode potential of the diode D1, the diode D1 is cut off, and the current flows from DC power source VDD to the light-emitting diode light string 1 through the source and drain of the field-effect transistor Q1, and the direct-current power supply with the first voltage supplies power to the light-emitting diode light string 1, and drives the light-emitting diode light string 1 to emit light.

3. When the control unit 5 sends a light-emitting pulse signal composed of several low and high levels, and the control unit 5 sends a high level to the gate of the field effect transistor Q1, the gate potential of the field effect transistor Q1 is high, the source potential is also high, and the voltage difference between the gate and source is less than 2V. Therefore, the field effect transistor Q1 is cut off, its drain potential is pulled down, and the drain potential is lower than the anode potential of the diode D1, so that the diode D1 is turned on, and current flows from the DC power source VDD to the light-emitting diode light string 1 through the first resistance R1 and the diode D1, and the DC power source having the second voltage supplies power to the light-emitting diode light string 1; the continuous opening and closing actions of the field effect transistor Q1 is controlled by the control unit 5 to form a light-emitting control command having a plurality of first voltages or second voltages, and the light-emitting control command is output to an electrically connected light-emitting diode light string 1, the light-emitting diode light string 1 receives the light-emitting control command and performs the corresponding light emission change.

4. When the light-emitting diode light string 1 works normally, the field effect transistor Q1 is turned on, and the current flowing through the third resistance R3 is less than 300 MA. The voltage at the cathode end of the light-emitting diode light string 1 is about 0.225V, and the turn-on voltage $V_{BE}$ of the transistor Q2 is about 0.5V, and the voltage difference between the base level of the transistor Q2 and the emitter is less than 0.225V, which is even smaller than the turn-on voltage of the transistor Q2. Therefore, the transistor Q2 is in the cut off state, and the current flows from the DC power source VDD through the second resistor R2 to the control unit 5. The control unit 5 receives the high-level of first protection signal, and the control unit 5 controls the opening and closing actions of the field effect transistor Q1 according to the light-emitting pulse signal. When a light-emitting diode in the light-emitting diode light string 1 is short-circuited, the DC power source VDD is connected to the cathode end of the light-emitting diode light string 1 through the turned-on field effect transistor Q1, that is, the end of the third resistance R3, the potential of the third resistance R3 is increased, the voltage value is equal to the first voltage. The turn-on voltage $V_{BE}$ of the transistor Q2 is a critical value. When the voltage at the cathode end is greater than the turn-on voltage $V_{BE}$ of the transistor Q2, the voltage difference between the base level of the transistor Q2 and the emitter is much larger than 0.5V, thus the transistor Q2 is turned on, and the DC power source VDD is grounded through the second resistance R2, the collector and the emitter of the transistor Q2. The control unit 5 receives a low level of second protection signal, and once the control unit 5 receives a low level, the field effect transistor Q1 is controlled to cut off. At this time, the light-emitting diode light string 1 does not emit light, and the light-emitting pulse signal of the control unit 5 cannot generate a light-emitting control command through the switching unit 4 to send to the light-emitting diode. The light-emitting diode light string control system 6 enters the short-circuit protection state to prevent the light-emitting diode light string 1 from being burned out when it is connected to a higher first voltage for a longer time, to achieve the protection of light string, and the light-emitting diode LED1 in the second power generating unit does not emit light, playing a role of prompting short-circuit fault. After the control unit 5 receives the low level of the second protection signal, the field effect transistor Q1 is controlled to cut off, and the field effect transistor Q1 is controlled to be turned on again after a delay predetermined time. If the light-emitting diode light string 1 is still short-circuited, the transistor Q2 is turned on, and the control unit 5 quickly controls the field effect transistor Q1 to turn off after receiving the low level again. The control unit 5 controls the field effect transistor Q1 to turn on again after an interval predetermined time T, and repeats the cycle according to the above process until the fault is removed and the transistor Q3 is cut off. The removing of the short-circuit fault is monitored in real-time, and the turn-on time of the field effect transistor Q1 is very short, which can prevent the light-emitting diode light string 1 from burning out. When the short-circuit fault is removed, the light-emitting diode light string 1 works normally, the DC power source having the first voltage supplies power to the light-emitting diode light string 1, the voltage at the cathode end of the light-emitting diode light string 1 is pulled down, and the current flowing through the third resistance R3 becomes smaller, which is smaller than 300 MA. The voltage at the cathode is less than 0.225V, and it is also smaller than the turn-on voltage $V_{BE}$ of the transistor Q2. Therefore, the voltage difference between the base level of the transistor Q2 and the emitter is smaller than the turn-on voltage of the transistor Q2, and the transistor Q2 is cut off. The current flows from the DC power source VDD through the second resistor R2 to the control unit 5. The control unit 5 receives the high-level of first protection signal, and the control unit 5 controls the opening and closing actions of the field effect transistor Q1 according to the light-emitting pulse signal, and the light-emitting diode light string control system 6 automatically resumes normal operation.

According to the present invention, the light-emitting control command sent by the control unit 5 is loaded on the power line of the light-emitting diode light string 1 through a carrier wave mode to realize the driving of the brightness variation of the light-emitting diode light string 1, which enables several parallel light-emitting diodes to be synchronized or asynchronous operation without configuring additional signal transmission lines, it saves costs and simplifies the control circuit of the light-emitting diode light string 1.

The short-circuit protection unit 2 of the present invention detects whether the light-emitting diode is short-circuited in real time, has fast response rate to the protection of the light-emitting diode light string 1 when it is short-circuited. Once a short-circuit fault is detected, the short-circuit protection unit 2 sends a low-level second protection signal to the control unit 5. The control unit 5 controls the switching unit 4 to cut off, and the light-emitting diode light string 1 is disconnected from the DC power supply with the first voltage in time, protecting the remaining light-emitting diodes and power supply units 7, thereby reducing maintenance costs and economic losses; when the short-circuit fault is removed, the light-emitting diode light string control system 3 can automatically resume normal operation, reducing the maintenance work and improving the resource utilization rate. The short-circuit protection unit 2 can be realized using only needs one transistor and two resistances, the circuit is simple, fewer components are needed, and is easy to implement. The present invention can be controlled remotely and can freely adjust the brightness, color and light emission change of the light-emitting diode light string 1.

The above description is an explanation of the present invention and is not limited thereto. The present invention can be modified in any form without departing from the spirit of the invention.

The invention claimed is:

1. A light-emitting diode light string control system, comprising:
    a switching unit (4) having a power input end (41), a power output end (42), and a controlled end (43); the power output end is connected to the light-emitting diode light string (1);
    a control unit (5), and the control unit (5) is connected to the controlled end (43) of the switching unit (4);
    a second power generating unit (3), and the second power generating unit (3) is connected to the light-emitting diode light string (1);
    when no light-emitting pulse signal is to be transmitted, the control unit (5) controls the switching unit (4) to be turned on, and the power supply unit (7) transmits a DC power supply having a first voltage to the light-emitting diode light string (1) to drive the light emission of the light-emitting diode light string (1); when the light-emitting pulse signal generated by the control unit (5) is to be transmitted, the control unit (5) controls the on and off actions of the switching unit (4), and when the control unit (5) controls the switching unit to cut off (4), the DC current having a second voltage generated by the second power generating unit (3) is transmitted to the light-emitting diode light string (1); and the second voltage is less than the first voltage.

2. The light-emitting diode light string control system according to claim 1, wherein it further comprises a short-circuit protection unit (2), which connects the light-emitting diode light string (1) and the light-emitting diode light string (1); the short-circuit protection unit (2) detects the voltage value of the cathode end of the light-emitting diode light string (1), when the voltage value is greater than a critical value, the short-circuit protection unit (2) sends a second protection signal, and the control unit (5) controls the switching unit to cut off (4); when the existing voltage is less than the critical value, the short-circuit protection unit (2) sends a first protection signal or does not send a signal.

3. The light-emitting diode light string control system according to claim 1, wherein it further comprises a short-circuit protection unit (2), and the short-circuit protection unit (2) includes:
    a third resistance R3, the third resistance R3 is connected to the cathode end of the light-emitting diode light string (1);

a fourth resistance R4, the fourth resistance R4 is connected to the base level of the transistor Q2 and the third resistance R3;

the transistor Q2 and the collector of the transistor Q2 are connected to the control unit (5).

4. The light-emitting diode light string control system according to claim 3, wherein the short-circuit protection unit (2) further comprises a second resistance R2, and two ends of the second resistance R2 are connected to the collector of the transistor Q2 and the power supply unit (7), respectively.

5. The light-emitting diode light string control system according to claim 1, wherein the second power generating unit (3) comprises:

a first resistance R1, and the first resistance R1 is connected to the power supply unit (7);

a capacitor C2, and the capacitor C2 is connected to the divider resistance R1;

a diode D1, and the diode D1 is connected to the first resistance R1 and the power output end (42);

a voltage stabilizing element, and the voltage stabilizing element is connected to the first resistance R1.

6. The light-emitting diode light string control system according to claim 5, wherein the voltage stabilizing element is a light-emitting diode LED1.

7. The light-emitting diode light string control system according to claim 1, wherein it further comprises a wireless receiving unit (9), the wireless receiving unit (9) connecting the control unit (5) and the power supply unit (7), and the wireless receiving unit (9) is connected to an external remote control via radio waves or infrared ray.

8. The light-emitting diode light string control system according to claim 1, wherein it further comprises a storage unit (8), the storage unit (8) is connected to the control unit (5), and the storage unit (8) stores the address coding and color coding of the light-emitting diode light string (1).

9. The light-emitting diode light string control system according to claim 1, wherein the switching unit (4) is a field-effect transistor, and the control unit (5) includes a microprocessor.

* * * * *